(12) United States Patent
Nordback

(10) Patent No.: US 9,817,795 B2
(45) Date of Patent: Nov. 14, 2017

(54) DOCUMENT LAYOUT FOR ELECTRONIC DISPLAYS

(71) Applicant: Konica Minolta Laboratory U.S.A., Inc., San Mateo, CA (US)

(72) Inventor: Kurt N. Nordback, Portland, OR (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 198 days.

(21) Appl. No.: 14/528,556

(22) Filed: Oct. 30, 2014

(65) Prior Publication Data

US 2016/0124910 A1 May 5, 2016

(51) Int. Cl.
*G06F 17/00* (2006.01)
*G06F 17/21* (2006.01)

(52) U.S. Cl.
CPC .......... *G06F 17/212* (2013.01); *G06F 17/214* (2013.01)

(58) Field of Classification Search
CPC .... G06F 17/212; G06F 17/241; G06F 17/211; G06F 17/2247
See application file for complete search history.

(56) References Cited

U.S. PATENT DOCUMENTS

| | | | |
|---|---|---|---|
| 6,915,484 B1 | 7/2005 | Ayers et al. | |
| 2002/0154146 A1* | 10/2002 | Rodriquez | G06F 3/0481 345/660 |
| 2003/0014445 A1* | 1/2003 | Formanek | G06F 17/211 715/247 |
| 2005/0134693 A1* | 6/2005 | Torimoto | H04N 1/00209 348/207.99 |
| 2006/0026512 A1* | 2/2006 | Hays | G06F 17/217 715/251 |
| 2006/0103667 A1* | 5/2006 | Amit | G06F 17/211 345/619 |
| 2007/0192686 A1* | 8/2007 | Fortes | G06F 17/211 715/244 |
| 2007/0266335 A1* | 11/2007 | Zielinski | G06F 3/0481 715/787 |
| 2007/0266355 A1 | 11/2007 | Cha et al. | |
| 2009/0109244 A1* | 4/2009 | Conner | G06F 9/4443 345/660 |
| 2010/0211866 A1 | 8/2010 | Nicholas et al. | |

(Continued)

OTHER PUBLICATIONS

Office Action in counterpart Japanese Patent Application No. 2015-207604 dated Aug. 1, 2017 (8 pages).

*Primary Examiner* — Howard Cortes
(74) *Attorney, Agent, or Firm* — Osha Liang LLP

(57) ABSTRACT

A method of operating a device having a screen with a display size, including: obtaining an electronic document (ED) having a text flow, multiple graphics, and a page size; calculating, during a first layout of the ED, locations for the multiple graphics on a page having the page size specified in the ED; generating a scaled version of the page having the display size by scaling the graphics and the locations, where scaling the graphics results in scaled graphics and scaling the locations results in scaled locations; placing, during a second layout of the ED, the text flow on the scaled version of the page with the scaled graphics at the scaled locations; and displaying, by the device, the scaled version of the page with the text flow and the scaled graphics at the scaled locations on the screen.

15 Claims, 5 Drawing Sheets

(56) References Cited

U.S. PATENT DOCUMENTS

| | | | | |
|---|---|---|---|---|
| 2011/0113323 A1* | 5/2011 | Fillion | ............... | G06F 17/211 |
| | | | | 715/252 |
| 2012/0096344 A1* | 4/2012 | Ho | ............... | G06F 17/211 |
| | | | | 715/249 |
| 2012/0110441 A1* | 5/2012 | Bellert | ............... | G06F 17/211 |
| | | | | 715/249 |
| 2012/0170077 A1* | 7/2012 | Bellert | ............... | G06F 17/2229 |
| | | | | 358/1.18 |
| 2012/0288190 A1* | 11/2012 | Tang | ............... | G06K 9/00 |
| | | | | 382/165 |
| 2013/0007603 A1* | 1/2013 | Dougherty | ............... | G06T 11/60 |
| | | | | 715/251 |

* cited by examiner

DOCUMENT LAYOUT FOR ELECTRONIC DISPLAYS

BACKGROUND

Display screens are found in many types of computing devices. Further, these display screens may be of any size. Mobile devices (e.g., smart phones, tablet computers, electronic readers, etc.) usually have small display screens, while stationary devices (e.g., desktop computers, servers, etc.) usually have larger display screens. The size of a viewing region on the display screen (i.e., the region where content can be displayed) may be specified, for example, as a width, a height, a diagonal, a set of dimensions, etc. Moreover, the size of the viewing region may be referred to as the display size.

An electronic document (ED) may include one or more text flows and multiple graphics. The position of each graphic is often specified relative to the position of a text element (e.g., character, word, paragraph, chapter, column, etc.) in the text flow. The ED may also specify a page size. The page size may be a width, a height, a diagonal, a set of dimensions, etc. of the intended page on which to layout the ED. Following a layout of the ED on a page having the specified page size, the graphics and the relative positions of the graphics to each other convey meaning and contribute to the aesthetics of the displayed ED.

When an ED specifying a page size is displayed on a screen having a display size that is different (e.g., smaller) than the page size, it often becomes necessary to modify the layout of the ED. However, as a result of this modification, the positions of the graphics change, and thus, the meaning and aesthetics that are dependent on the relative positioning of the graphics to each other are lost. Regardless, users still wish to view EDs on screens having display sizes that are different than the specified page size of the ED.

SUMMARY

In general, in one aspect, the invention relates to a method of operating a device comprising a screen having a display size. The method comprises: obtaining, by the device, an electronic document (ED) comprising a text flow, a plurality of graphics, and a page size; calculating, by the device during a first layout of the ED, a plurality of locations for the plurality of graphics on a page having the page size specified in the ED; generating, by the device, a scaled version of the page having the display size by scaling the plurality of graphics and the plurality of locations, wherein scaling the plurality of graphics results in a plurality of scaled graphics and scaling the plurality of locations results in a plurality of scaled locations; placing, by the device during a second layout of the ED, the text flow on the scaled version of the page comprising the plurality of scaled graphics at the plurality of scaled locations; and displaying, by the device, the scaled version of the page comprising the text flow and the plurality of scaled graphics at the plurality of scaled locations on the screen.

In general, in one aspect, the invention relates to a non-transitory computer readable medium (CRM) storing instructions for operating a device comprising a screen having a display size. The instructions comprise functionality for: obtaining an electronic document (ED) comprising a text flow, a plurality of graphics, and a page size; calculating, during a first layout of the ED, a plurality of locations for the plurality of graphics on a page having the page size specified in the ED; generating a scaled version of the page having the display size by scaling the plurality of graphics and the plurality of locations, wherein scaling the plurality of graphics results in a plurality of scaled graphics and scaling the plurality of locations results in a plurality of scaled locations; placing, during a second layout of the ED, the text flow on the scaled version of the page comprising the plurality of scaled graphics at the plurality of scaled locations; and displaying the scaled version of the page comprising the text flow and the plurality of scaled graphics at the plurality of scaled locations on the screen.

In general, in one aspect, the invention relates to a device. The device comprises: a screen having a display size; a parser configured to identify a text flow, a plurality of graphics, and a page size in an electronic document (ED); and a layout engine configured to: calculate, during a first layout of the ED, a plurality of locations for the plurality of graphics on a page having the page size; generate a scaled version of the page having the display size by scaling the plurality of graphics and the plurality of locations, wherein scaling the plurality of graphics results in a plurality of scaled graphics and scaling the plurality of locations results in a plurality of scaled locations; and place, during a second layout of the ED, the text flow on the scaled version of the page comprising the plurality of scaled graphics at the plurality of scaled locations, wherein the scaled version of the page comprising the text flow and the plurality of scaled graphics at the plurality of scaled locations is displayed on the screen.

Other aspects of the invention will be apparent from the following description and the appended claims.

DETAILED DESCRIPTION

Figure 1:
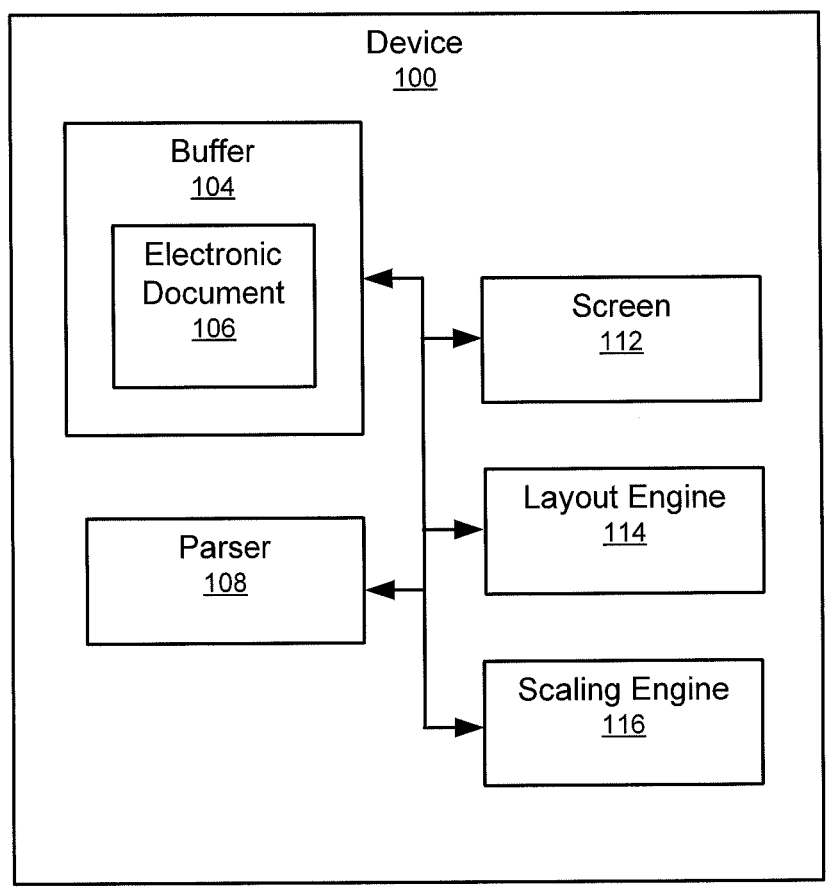
FIG. 1 shows a device in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a device comprising a screen, a method of operating a device comprising a screen, and a computer readable medium storing instructions for operating a device comprising a screen. Specifically, once an electronic document (ED) having a text flow and multiple graphics is obtained, an initial layout of the ED is executed and the locations of the graphics on a page having the page size specified in the ED are calculated. The initial layout may include placing the text flow on the page. A scaled (e.g., reduced) version of the page is generated by scaling the graphics and the locations based on a ratio of the page size and the display size of the screen. With these scaled graphics fixed/locked in the scaled locations, a subsequent layout of the ED is executed and the text flow is placed on the scaled version of the ED. The text flow placed during the subsequent layout may replace the text flow placed during the initial layout of the ED. Further, the text flow placed during the subsequent layout follows any layering attributes with respect to the graphics (i.e., z-level coordinates) and any text wrapping modes specified in the ED.

FIG. 1 shows a device (100) in accordance with one or more embodiments of the invention. As shown in FIG. 1, the device (100) has multiple components including, for example, a buffer (104), a parser (108), a screen (112), a layout engine (114), and a scaling engine (116). Each of these components is discussed below. Moreover, the device (100) may be a mobile computer device (e.g., smart phone, tablet computer, laptop, e-reader, etc.), a desktop personal computer (PC), a kiosk, a server, a mainframe, a cable box, etc.

In one or more embodiments of the invention, the device (100) includes a screen (112). The screen (112) may be of any resolution and capable of displaying text, graphics, images, videos, animation, etc. in any color. The size of the viewing region on the screen (112) (i.e., the region where content can be displayed) may be specified, for example, as a width, a height, a diagonal, a set of dimensions, etc. Moreover, the size of the viewing region may be referred to as the display size. Although FIG. 1 shows the screen (112) as being part of the device (100), in one or more embodiments of the invention, the screen (112) is external to the device (100). For example, the screen (112) may be a desktop monitor or a television that is separate from the device (100).

In one or more embodiments of the invention, the device (100) includes a buffer (104). The buffer (104) may be of any size and may be composed of any type of memory or long-term storage (e.g., hard drive). As shown in FIG. 1, the buffer (104) holds/stores an electronic document (ED) (106). The ED (106) is obtained by the device (100). For example, the ED (106) may be downloaded by the device (100) over a network having wired and/or wireless segments. As another example, the device (100) may obtain the ED (106) from a flash drive or other storage medium. Examples of the ED (106) include web pages (e.g., hypertext markup language (HTML) files), Open Office XML (OOXML) files or files generated using any markup language, slide show presentations, spreadsheets, etc.

In one or more embodiments of the invention, the ED (106) includes at least one text flow to be displayed. A text flow corresponds to the main body text of the ED (106). The text flow may have any number of text elements (i.e., characters, words, sentences, paragraphs, columns, etc.). The ED (106) may specify fonts, font sizes, colors, styles, etc. in which to display the text flow.

In one or more embodiments of the invention, the ED (106) includes multiple graphics to be displayed. A graphic may correspond to an image, clipart, a header, a footer, a sidebar, a figure caption, or anything else in the ED (106) that is displayed other than the main body text of the ED (106). In one or more embodiments, the ED (106) specifies the position of each graphic relative to the position of a text element (e.g., character, word, paragraph, chapter, column, etc.) in the text flow. In order words, the ED (106) may include offsets for each graphic that will be used to calculate the position of the graphic once the position of the corresponding text element is determined.

In one or more embodiments of the invention, the ED (106) specifies a page size. The page size may be a width, a height, a diagonal, a set of dimensions, etc. of the intended page on which to layout the ED (106). Following a layout of the ED (106) on a page having the specified page size, the graphics and the relative positions of the graphics with respect to each other convey meaning and contribute to the aesthetics of the displayed ED, as intended by the author of the ED (106). In one or more embodiments of the invention, the page size and the display size of the screen (112) are not identical. In fact, if the device (100) is a mobile computing device, the display size may be smaller than the page size. In such embodiments, in order to display the ED (106) on the screen (112), it becomes necessary either to shrink the entire ED (106) to fit on the screen, in which case text may be so small as to be difficult to read, or to allow the ED (106) to extend beyond the edge of the screen in both horizontal and vertical directions, diminishing usability by requiring the reader to scroll both left-right and up-down, or to modify the layout of the ED (106) (discussed below). However, the modification should be executed to preserve the relative positions of the graphics with respect to each other, and thus preserve the conveyed meaning and aesthetics that are dependent on the relative positioning of the graphics.

In one or more embodiments of the invention, the device (100) includes a parser (108). The parser (108) may be configured to identify the one or more text flows, graphics, fonts, font sizes, offsets, page size, etc. in the ED (106) by parsing the ED (106). One or more of the text flows, graphics, fonts, font sizes, offsets, page size, etc. may be specified as attributes within tags in the ED (106).

In one or more embodiments of the invention, the device (100) includes a scaling engine (116). The scaling engine (116) is configured to calculate a scale factor α based on the page size in the ED (106) and the display size of the screen (112). In one or more embodiments of the invention, the scale factor α is a ratio of the display size of the screen (112) to the page size of the ED (106). For example, if the display size is specified as a width ($W_D$) and the page size is specified as a width ($W_P$), the scale factor $\alpha = W_D/W_P$. The scaling engine (116) may execute any algorithm for calculating the scale factor α. In case each line of the text flows in the ED (106) is to be laid-out in the horizontal direction (a horizontal written case) as in the exemplary embodiment, the scale factor α is preferably calculated based on the page width and the display width. On the other hand, in case each line of the text flows is to be laid-out in vertical direction (a vertical written case), the scale factor α is preferably calculated based on the page height and the display height.

In one or more embodiments of the invention, the device (100) includes a layout engine (114). The layout engine (114) may be configured to calculate the locations (e.g., coordinates) of the graphics on a page having the specified page size. Specifically, the locations of the graphics are calculated during an initial layout of the ED (106). As discussed above, the location of each graphic may depend on the page position of a text element in the text flow(s). Accordingly, it may be necessary during the initial layout to first place the text flow(s) on the page in order to calculate the locations of the graphics on the page. During this initial layout, the text flows may be placed based on the fonts, font sizes, fonts styles, etc. specified in the ED (106).

In one or more embodiments of the invention, the layout engine (114) is configured to generate a scaled (e.g., reduced, enlarged) version of a page. The scaled version of the page has the display size (e.g., width, length, dimensions, or diagonal, etc.) of the screen (112). In one or more embodiments of the invention, the scaled version of the page is generated by isometrically scaling the graphics and the locations of the graphics according to the scale factor α. Then, with the scaled graphics fixed/locked in their scaled locations, a subsequent layout of the ED (106) is executed. During this subsequent layout, the text flow(s) is placed on the scaled version of the page obeying any rules (e.g., layering attributes, z-coordinates, text wrapping modes) regarding the interaction of text and graphics. In one or more embodiments of the invention, during the subsequent layout of the ED (106), the text flow(s) is placed based on the fonts, font sizes, font styles, etc. specified in the ED (106). In one or more embodiments of the invention, during the subsequent layout of the ED (106), the text flow(s) is placed based on different fonts, different (e.g., smaller) font sizes, different font styles, etc. than those specified in the ED (106).

Those skilled in the art, having the benefit of this detailed description, will appreciate that during the initial layout of the ED (106), both the text flow and the graphics are placed on the page. However, during the subsequent layout, only the text flow is placed on the scaled version of the page (i.e., the graphics are not placed during the subsequent layout because the scaled graphics are already present on the scaled version of the page). Moreover, the text flow placed during the subsequent layout replaces the text flow placed during the initial layout. Additionally or alternatively, the scaled version of the page might not have any of the text flow from the initial layout.

As discussed above, a graphic may correspond to an image, clipart, a footer, a header, a figure caption, a sidebar, etc. In one or more embodiments of the invention, when the graphic is a footer, the scaled footer is placed after (i.e., below) the text flow placed during the subsequent layout. In other words, unlike the other scaled graphics, the scaled footer is not fixed/locked into place during the subsequent layout.

Those skilled in the art, having the benefit of this detailed description, will appreciate that the scaled version of the page is better suited for display on the screen (112). Specifically, it may only be necessary for the user of the device (100) to scroll in one direction to read the entire page. Further, by fixing/locking the scaled graphics at the scaled locations during the subsequent layout, and the relative positions of the graphics with respect to each other, the conveyed meaning and aesthetics that are dependent on the relative positioning of the graphics are preserved in the scaled version of the page. Further still, by reformatting (rather than resealing) the text flow via the subsequent layout, the characters of the text flow remain large enough in the scaled version of the page to be readable when the scaled version of the page is displayed on the screen (112).

Figure 2:
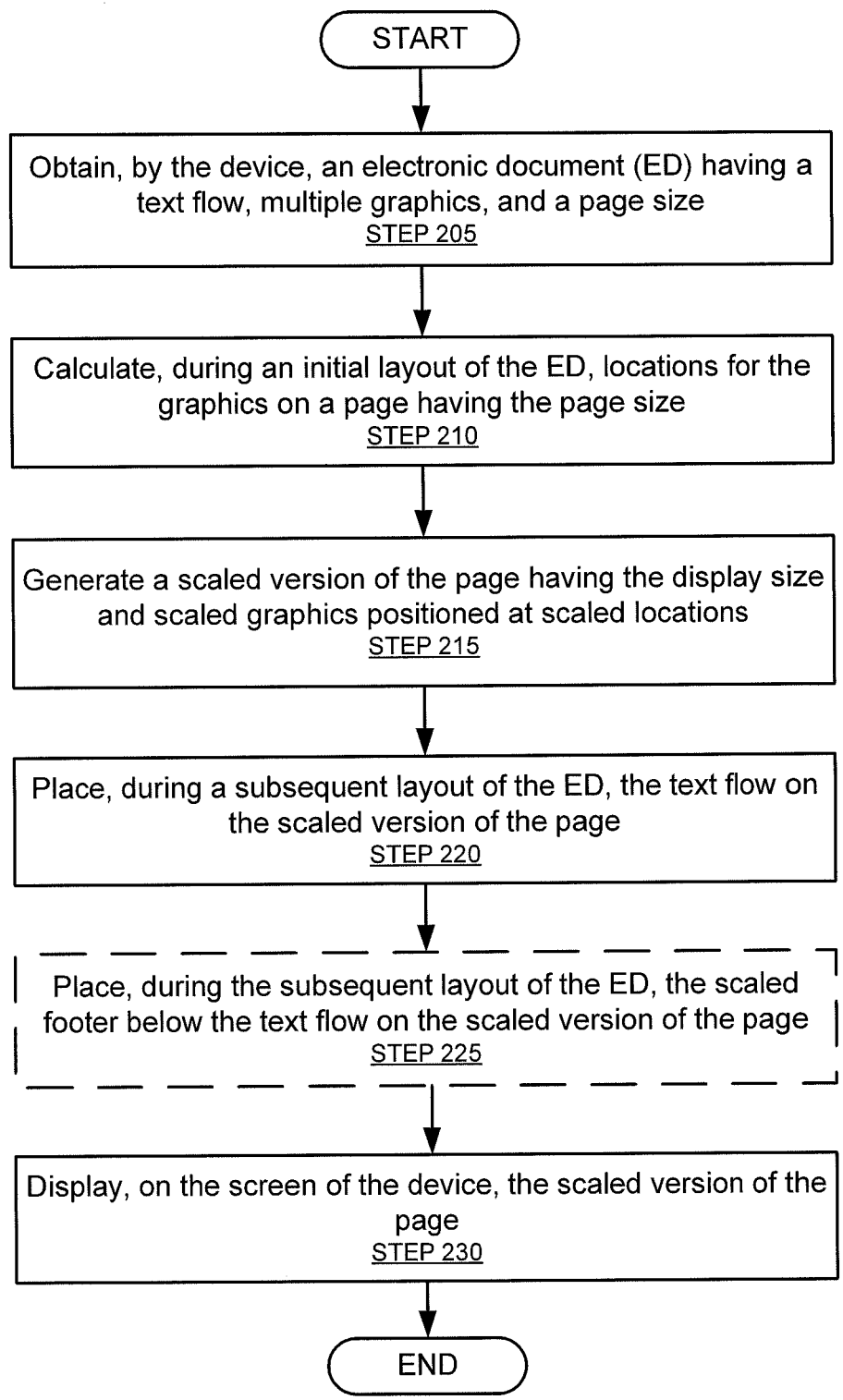
FIG. 2 shows a flowchart in accordance with one or more embodiments of the invention.

FIG. 2 shows a flowchart in accordance with one or more embodiments of the invention. The flowchart depicts a process for operating a device comprising a screen. One or more of the steps in FIG. 2 may be performed by the components of the device (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an ED is obtained by the device (STEP 205). The device may be a mobile device (e.g., a smart phone, tablet computer, electronic reader, etc.) and has a screen with a display size. The ED may include/specify a text flow, multiple graphics, and a page size. The text flow may have any number of text elements (i.e., characters, words, sentences, paragraphs, columns, etc.). Each graphic may correspond to an image, clipart, a header, a footer, a sidebar, a figure caption, or anything else in the ED that is displayed other than the main body text of the ED. In one or more embodiments, the ED specifies the position of each graphic relative to the position of a text element in the text flow.

In STEP 210, the locations of the graphics on a page having the specified page size are calculated. The ED may specify the position of each graphic as an offset from the position of a text element. Accordingly, these calculations are executed during an initial layout of the ED during which the text flow is placed on the page having the specified page size. Following the initial layout of the ED on the page, the graphics and the relative positions of the graphics with respect to each other convey meaning and contribute to the aesthetics of the ED, as intended by the author of the ED.

In STEP 215, a scaled version of the page is generated. The scaled version of the page has the display size (e.g., display width, or display height, or display diagonal, etc.) of the device's screen. In one or more embodiments of the invention, the scaled version of the page is generated by isometrically scaling the graphics and the locations of the graphics based on a scale factor. The scale factor may be calculated as the ratio of the display size to the page size.

In STEP 220, with the scaled graphics fixed/locked at the scaled positions, a subsequent layout of the ED is executed. During this subsequent layout of the ED, only the text flow (i.e., not the graphics) is placed on the scaled version of the page, obeying any rules (e.g., layering attributes, z-coordinates) regarding the interaction of text and graphics. The text flow placed in STEP 220 may replace the text flow placed in STEP 210.

As discussed above, a graphic may correspond to an image, clipart, a footer, a header, a figure caption, a sidebar, etc. In one or more embodiments of the invention, when the graphic is a footer, the scaled footer is placed after (i.e., below) the text flow placed during the subsequent layout (STEP 225). In other words, unlike the other scaled graphics, the scaled footer is not fixed/locked into place during the subsequent layout. In one or more embodiments, STEP 225 is optional.

In STEP 230, the scaled version of the page is displayed on the screen. Those skilled in the art, having the benefit of this detailed description, will appreciate that the scaled version of the page is better suited for display on the screen. Specifically, it may only be necessary for the user of the device to scroll in one direction to read the entire page. Further, by fixing/locking the scaled graphics at the scaled locations during the subsequent layout, and the relative positions of the graphics with respect to each other, the conveyed meaning and aesthetics that are dependent on the relative positioning of the graphics are preserved in the scaled version of the page. Further still, by reformatting (rather than resealing) the text flow via the subsequent layout, the characters of the text flow remain large enough in the scaled version of the page to be readable when the scaled version of the page is displayed on the screen.

Figure 3A:
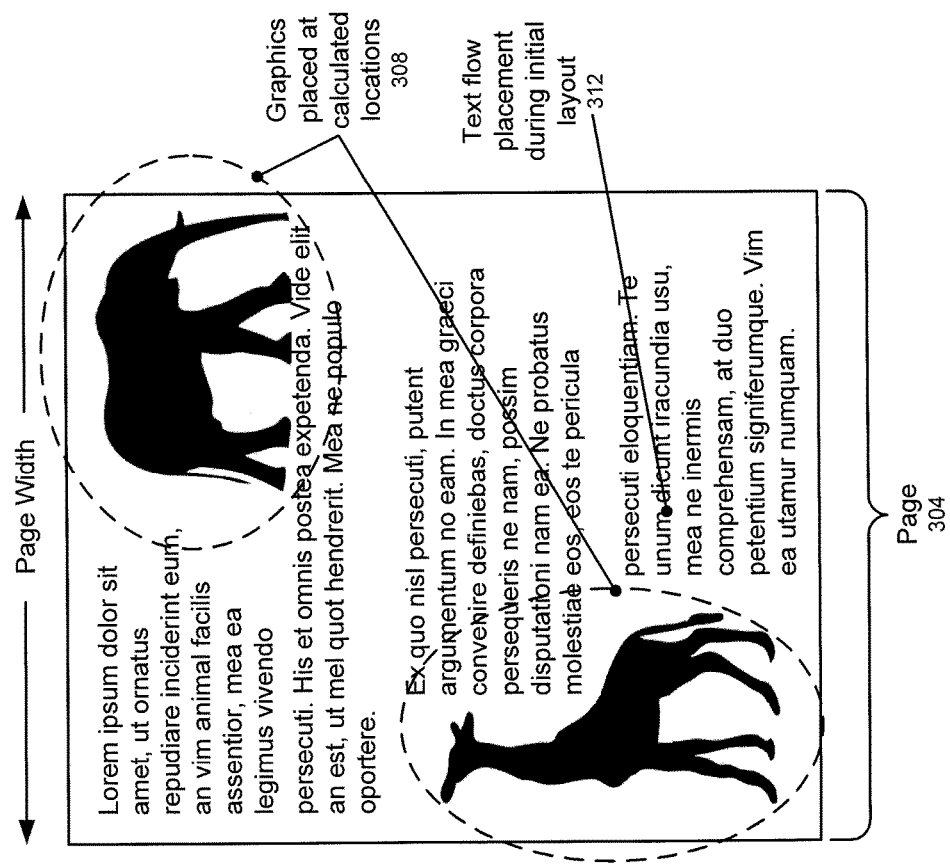
FIG. 3A and FIG. 3B show an example in accordance with one or more embodiments of the invention.
Figure 3B:
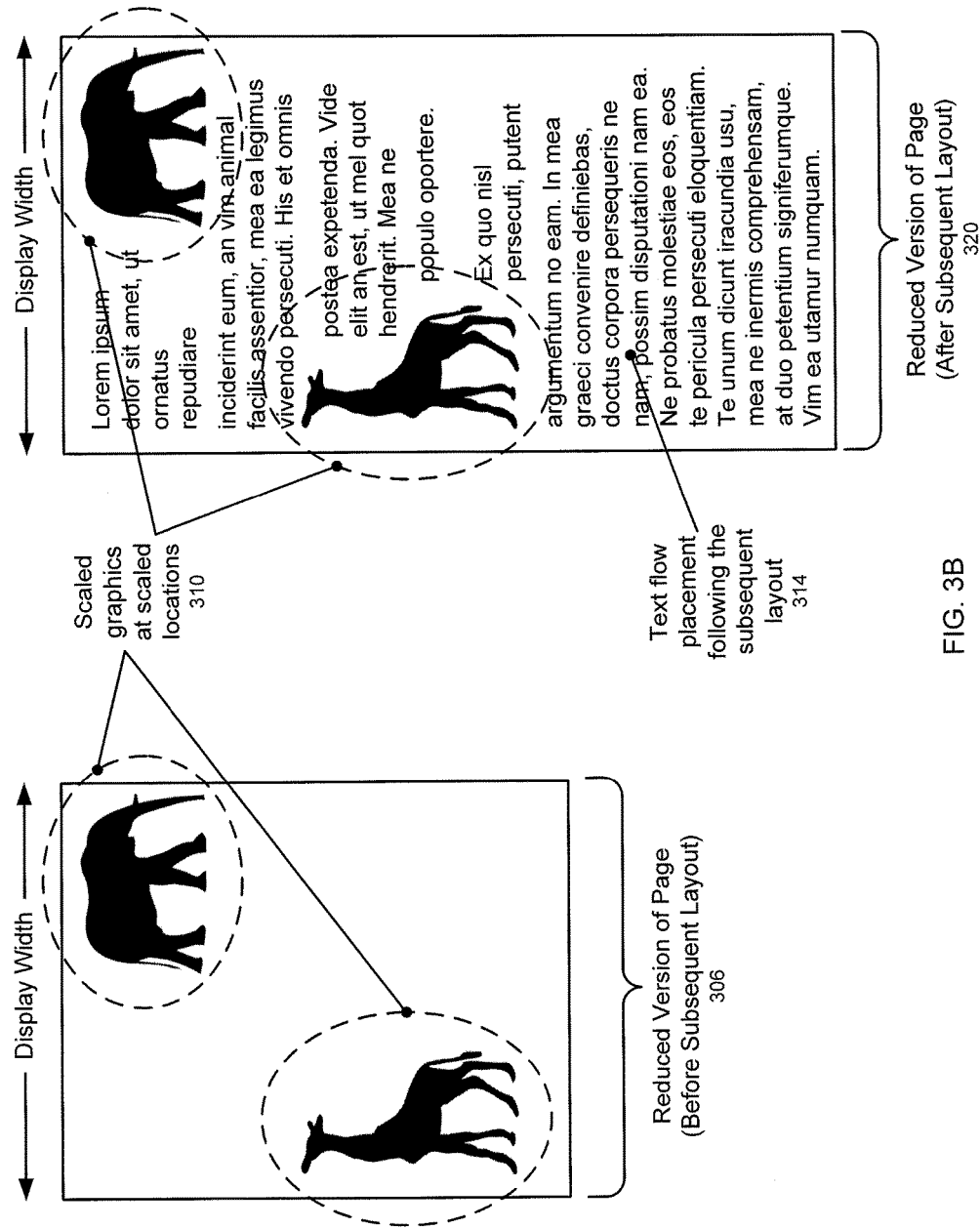

FIG. 3A and FIG. 3B show an example in accordance with one or more embodiments of the invention. Assume there exists an ED specifying a text flow, two graphics, and a page width. Moreover, assume the ED also specifies the locations of the two graphics relative to text elements in the text flow. FIG. 3A shows the initial layout of the ED on a page (304) having the specified page width. During the initial layout, the text flow (312) is placed on the page (304), and the locations of the two graphics (308) are calculated based on the positions of the corresponding text elements in the text flow (312). The graphics (308) and the relative locations of the graphics with respect to each other convey meaning and contribute to the aesthetics of the displayed ED, as intended by the author of the ED.

Now assume the ED is to be displayed on a device with a screen having a display width that is smaller than the page width. For example, the device may be a smart phone. A scale factor α relating the display width to the page width may be calculated as: α=(display width)/(page width). In order to display the ED, a reduced version of the page is generated based on the scale factor. Specifically, the graphics and the locations of the graphics are isometrically scaled according to the scale factor. The scaled graphics are locked/fixed at their scaled locations on a reduced version of the page having the display width. Then, during a subsequent layout, the text flow is placed on the page having the display width and the locked scaled graphics.

FIG. 3B shows the reduced version of the page (306) before the subsequent layout. The reduced version of the page (306) has the display width. Further, the reduced version of the page (306) has the scaled graphics (310) at their scaled locations. Although the reduced version of the page (306) is smaller than the page (304), the scaled graphics (310) and the relative positions of the graphics with respect to each other still convey the meaning intended by the author and still contribute to the aesthetics of the displayed ED, as intended by the author.

FIG. 3B also shows the reduced version of the page (320) following the subsequent layout. The reduced version of the page (320) now has the text flow (314). In this example, the font and the font size of the text flow (314) are identical to the font and the font size of the text flow (312). Those skilled in the art, having the benefit of this detailed description, will appreciate that the reduced version of the page (320) is better suited for display on the screen of the device. Specifically, it may only be necessary for the user of the device (100) to scroll in one direction (i.e., vertically) to read the entire page. Further still, by reformatting (rather than rescaling) the text flow via the subsequent layout, the characters of the text flow remain large enough in the reduced version of the page to be readable when the scaled version of the page is displayed on the screen (112).

Various embodiments of the invention may have one or more of the following advantages: the ability to display an ED on a screen having a screen size that is different than the page size specified in the ED; the ability to preserve the relative positions of the graphics in the ED with respect to each other on a scaled version of the page, and thus preserve the conveyed meaning and aesthetics that are dependent on the relative positioning of the graphics; the ability to generate a displayed ED that only requires scaling in one direction to read the displayed ED; the ability to reformat (rather than rescale) the text flow via a subsequent layout and thus keep characters of the text flow large enough in the scaled version of the page to be readable; the ability to handle footers differently than other graphics in the ED; etc.

Figure 4:
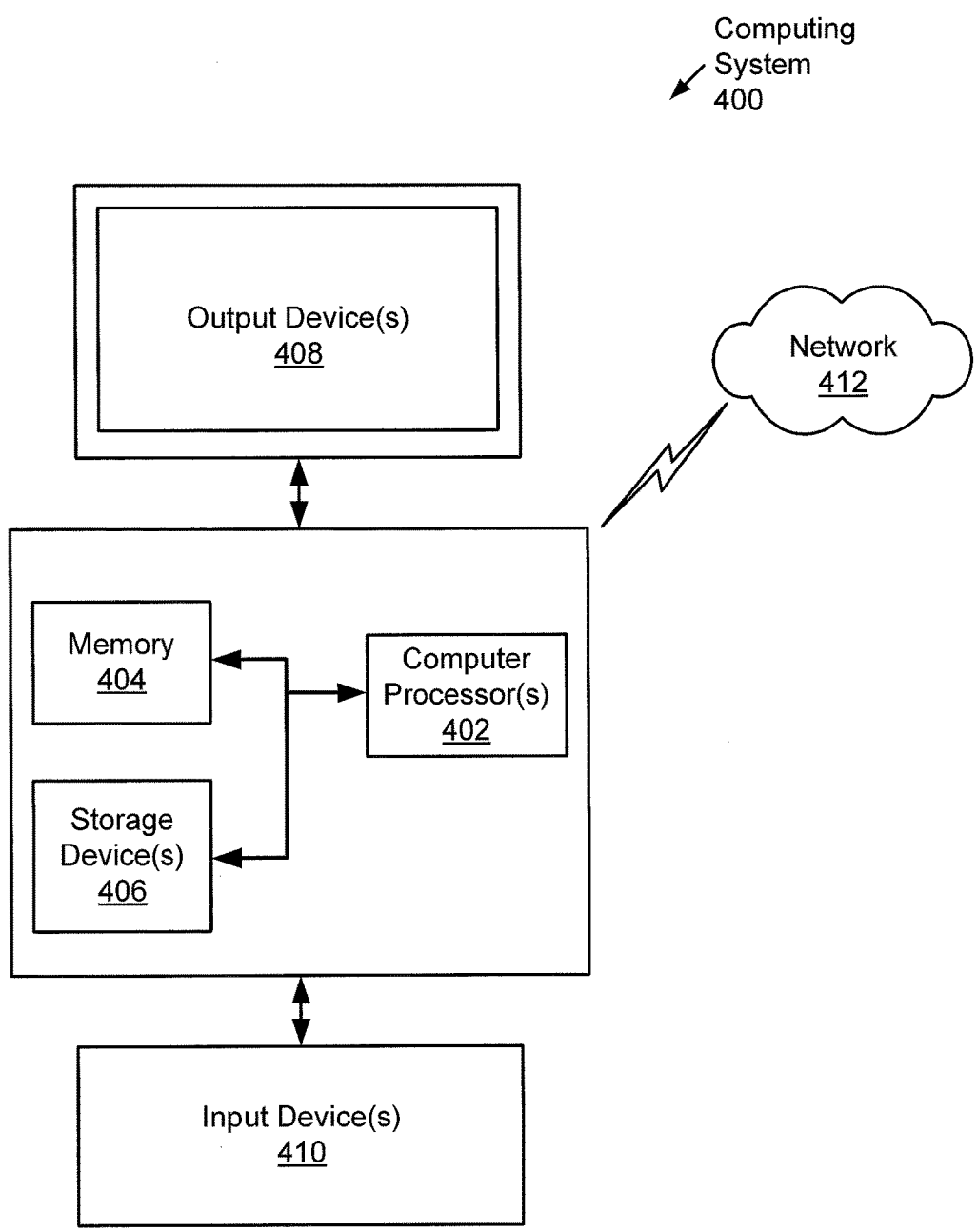
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of operating a device comprising a screen having a display size, comprising:
   obtaining, by the device, an electronic document (ED) comprising a text flow, a plurality of graphics, and a page size;

calculating, by the device during a first layout of the ED, a plurality of locations for the plurality of graphics on a page having the page size specified in the ED,
wherein the text flow is placed on the page during the first layout,
wherein the plurality of locations comprises a location for a graphic of the plurality of graphics, and
wherein the location is calculated based on an offset specified in the ED from a position of a text element in the text flow placed during the first layout;
generating a plurality of scaled graphics by scaling the plurality of graphics and calculating a plurality of scaled locations by scaling the plurality of locations,
wherein the plurality of scaled locations comprises a scaled location corresponding to the location;
generating, by the device, a scaled version of the page in the display size and comprising the plurality of scaled graphics fixed at the plurality of scaled locations;
placing, by the device during a second layout of the ED, the text flow on the scaled version of the page after the plurality of scaled graphics are fixed at the plurality of scaled locations,
wherein the second layout of the ED replaces the text flow placed during the first layout,
wherein the plurality of scaled graphics are fixed at the plurality of scaled locations during the second layout of the ED,
wherein the plurality of scaled graphics comprises a scaled graphic corresponding to the graphic and fixed at the scaled location before the text element is placed during the second layout; and
displaying, by the device, the scaled version of the page comprising the text flow and the plurality of scaled graphics at the plurality of scaled locations on the screen.

2. The method of claim 1, wherein the text element is at least one selected from a group consisting of a character, a word, and a paragraph.

3. The method of claim 1, wherein the plurality of graphics comprises at least one selected from a group consisting of a figure caption, a sidebar, a header, and a footer.

4. The method of claim 1, wherein the ED further comprises a first font size for the text flow, wherein the text flow is in the first font size during the first layout, and wherein the text flow is in a second font size during the second layout.

5. The method of claim 1, wherein the ED further comprises a font size for the text flow, wherein the text flow is in the font size during both the first layout and the second layout.

6. The method of claim 1, further comprising:
calculating a scale factor based on the display size and the page size,
wherein the plurality of graphics and the plurality of locations are scaled according to the scale factor.

7. The method of claim 6, wherein the display size is a width of the screen, and wherein the page size is a width of the page.

8. The method of claim 6, wherein the ED comprises a footer, wherein the footer is scaled according to the scale factor resulting in a scaled footer, and wherein the scaled footer is placed below the text flow on the scaled version of the page.

9. A non-transitory computer readable medium (CRM) storing instructions for operating a device comprising a screen having a display size, the instructions having functionality for:
obtaining an electronic document (ED) comprising a text flow, a plurality of graphics, and a page size;
calculating, during a first layout of the ED, a plurality of locations for the plurality of graphics on a page having the page size specified in the ED,
wherein the text flow is placed on the page during the first layout,
wherein the plurality of locations comprises a location for a graphic of the plurality of graphics, and
wherein the location is calculated based on an offset specified in the ED from a position of a text element in the text flow placed during the first layout;
generating a plurality of scaled graphics by scaling the plurality of graphics and calculating a plurality of scaled locations by scaling the plurality of locations,
wherein the plurality of scaled locations comprises a scaled location corresponding to the location;
generating a scaled version of the page in the display size and comprising the plurality of scaled graphics fixed at the plurality of scaled locations;
placing, during a second layout of the ED, the text flow on the scaled version of the page after the plurality of scaled graphics are fixed at the plurality of scaled locations,
wherein the second layout of the ED replaces the text flow placed during the first layout,
wherein the plurality of scaled graphics are fixed at the plurality of scaled locations during the second layout of the ED, and
wherein the plurality of scaled graphics comprises a scaled graphic corresponding to the graphic and fixed at the scaled location before the text element is placed during the second layout; and
displaying the scaled version of the page comprising the text flow and the plurality of scaled graphics at the plurality of scaled locations on the screen.

10. The non-transitory CRM of claim 9, wherein:
the ED specifies a first font size for the text flow;
the text flow is in the first font size during the first layout; and
the text flow is in a second font size during the second layout.

11. The non-transitory CRM of claim 9, the instructions further comprising functionality for:
calculating a scale factor based on the display size and the page size,
wherein the plurality of graphics and the plurality of locations are scaled according to the scale factor.

12. The non-transitory CRM of claim 11, wherein the ED comprises a footer, wherein the footer is scaled according to the scale factor resulting in a scaled footer, and wherein the scaled footer is placed below the text flow on the scaled version of the page.

13. A device, comprising:
a screen having a display size;
a memory; and
a processor connected to the memory that:
identifies a text flow, a plurality of graphics, and a page size in an electronic document (ED);
calculates, during a first layout of the ED, a plurality of locations for the plurality of graphics on a page having the page size,
wherein the text flow is placed on the page during the first layout,
wherein the plurality of locations comprises a location for a graphic of the plurality of graphics, and wherein the location is calculated based on an offset specified in the ED from a position of a text element in the text flow placed during the first layout;

generates a plurality of scaled graphics by scaling the plurality of graphics and calculating a plurality of scaled locations by scaling the plurality of locations, wherein the plurality of scaled locations comprises a scaled location corresponding to the location;

generates a scaled version of the page in the display size and comprising the plurality of scaled graphics fixed at the plurality of locations; and places, during a second layout of the ED, the text flow on the scaled version of the page after the plurality of scaled graphics are fixed at the plurality of scaled locations, wherein the second layout of the ED replaces the text flow placed during the first layout, wherein the plurality of scaled graphics are fixed at the plurality of scaled locations during the second layout of the ED, wherein the plurality of scaled graphics comprises a scaled graphic corresponding to the graphic and fixed at the scaled location before the text element is placed during the second layout, and wherein the scaled version of the page comprising the text flow and the plurality of scaled graphics at the plurality of scaled locations is displayed on the screen.

14. The device of claim 13, wherein the processor also:

calculates a scale factor based on the display size and the page size, wherein the plurality of graphics and the plurality of locations are scaled according to the scale factor, and wherein the plurality of graphics comprises at least one selected from a group consisting of an image, clipart, a figure caption, a sidebar, and a header.

15. The device of claim 14, wherein the ED comprises a footer, wherein the footer is scaled according to the scale factor resulting in a scaled footer, and wherein the scaled footer is placed below the text flow on the scaled version of the page.

* * * * *